INVENTOR.
PHILIP GOTTLIEB

BY *Sidney Magnus*

AGENT

INVENTOR.
PHILIP GOTTLIEB

3,255,417
COMBINING CIRCUIT
Philip Gottlieb, Waco, Tex., assignor to
North American Aviation, Inc.
Filed July 9, 1962, Ser. No. 208,491
6 Claims. (Cl. 328—145)

This invention relates to circuitry for providing the ratio between two measurements.

Background

It is frequently necessary to determine the ratio between two measurements. In one case the two measurements may represent radar information, and their ratio would indicate range; in another case the measurements may represent vibrations of a missile, and the ratio might indicate a danger point; in still another case the ratio of the two measurements might indicate the resistivity of the soil, this factor being important in explorations for water.

Many devices have previously been suggested for producing the ratio between two measurements; but in the past these devices have had a serious shortcoming. This shortcoming is related to the large range of ratios that may be desirable. For example if both measurements are of approximately the same value, the ratio will be approximately 1; whereas if one measurement were a thousand times as large as the other, the ratio would be 1000. In most cases the indicating device is a meter, and if this meter was able to indicate clearly whether the ratio was 1.0 or 1.5, it would require an extremely long, and therefore impractical scale, to indicate a ratio of 1000. On the other hand, if the scale were calibrated so that it would show a reading of 1000, the distinction between a reading of 1.0 and a reading of 1.5 would be so slight that it would be impossible to distinguish between the ratios.

Objects and drawings

It is therefore the principal object of my invention to provide an improved combining circuit.

It is another object of my invention to provide an improved apparatus for obtaining a ratio.

It is a further object of my invention to provide a circuit that produces the ratio between two measurements.

Figure 1:
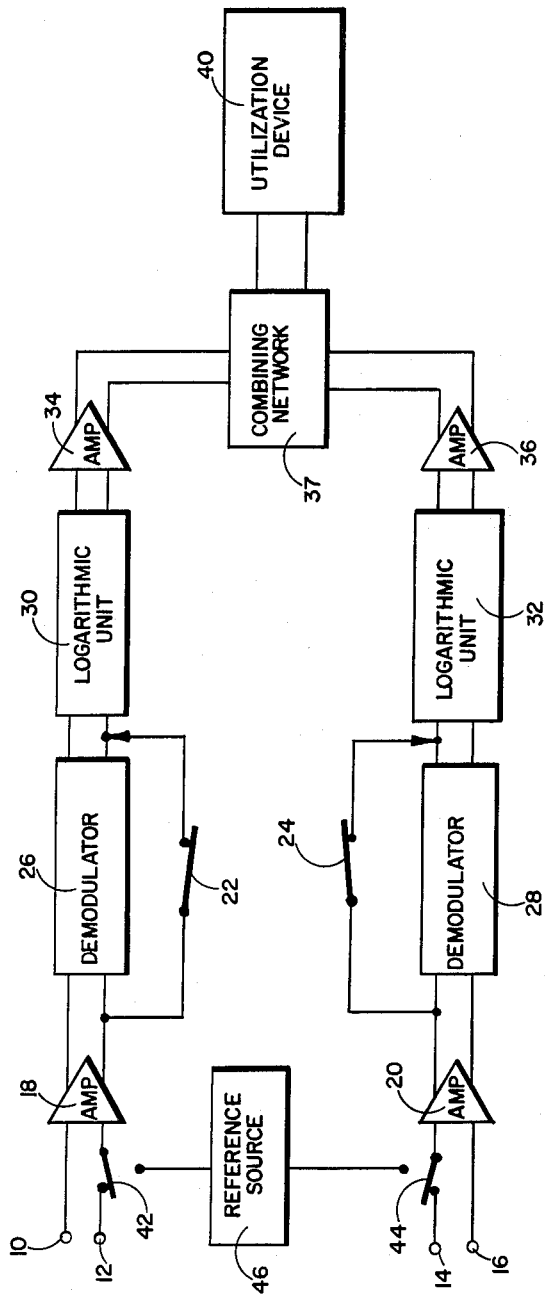
Figure 2:
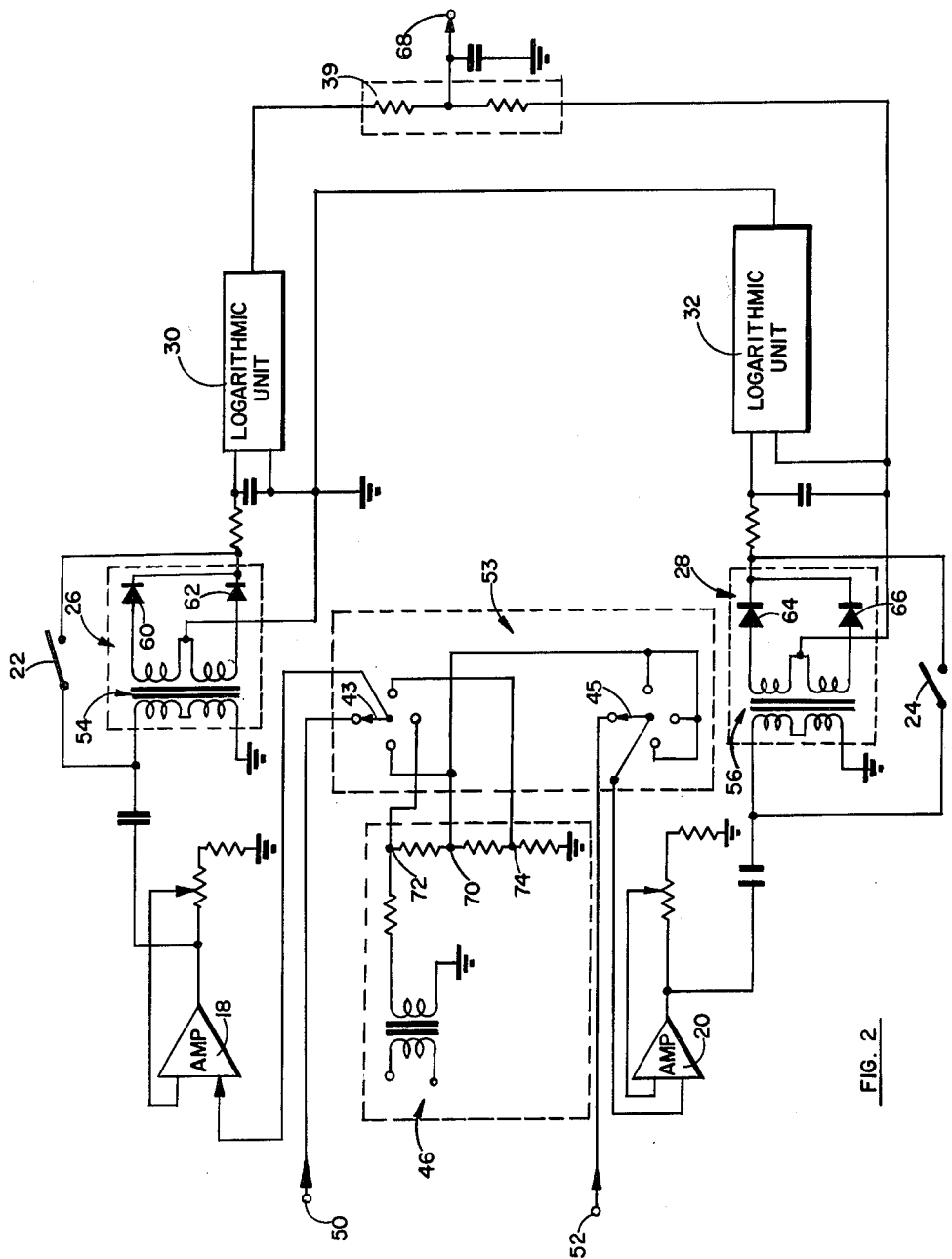

The attainment of these objects and others will be realized from the following specification, taken in conjunction with the drawings of which:

FIGURE 1 is a block diagram of my invention; and
FIGURE 2 is a schematic diagram of one embodiment of my invention.

Introduction

It is known that the number 100 may be written as $10^2$. This notation means that 10 is multiplied by itself twice ($10 \times 10$ equals 100), as indicated by the exponent 2. Similarly the number 1000 may be written as $10^3$. This notation means that 10 is multiplied by itself three times ($10 \times 10 \times 10$ equals 1000) as indicated by the exponent 3.

The exponents 2 and 3 of the previous examples, are known as "logarithms." Thus to multiply 10 by 100, ($10 \times 100$ equals 1000), the logarithm of 10, (1), is added to the logarithm of 100, (2), to give $10^3$ (1000). It may thus be seen that multiplication can be performed by adding the logarithms of the numbers being multiplied.

The addition of these logarithms gives a resultant logarithm (3 in the above case) of a particular number, (1000); and the resultant logarithm is called "logarithm" of that particular number.

The foregoing illustration used the numerals 10 and 100, but other numbers such as 13, 123, etc. may also be expressed in terms of logarithms. The principle still holds that to multiply these numbers together, their logarithms are added.

A similar situation arises in the division of numbers, for example 1000 divided by 10 equals 100. The same result can be achieved by the use of logarithms. To do this one would write $10^3$ (which represents 1000) divided by $10^1$ (which represents 10). To divide by the use of logarithms, one would take the logarithm, (3), of the dividend, subtract the logarithm (1), of the divisor, and get a resultant logarithm of 2. $10^2$ equals 100, which is the answer to 1000 divided by 10. It may thus be seen that division may also be performed by the use of logarithms, in this case by subtracting the logarithms of the numbers.

It should be noted that the process of obtaining a ratio is actually the process of division, which can be performed by subtracting suitable logarithms. Moreover the logarithms involved tend to have approximately the same magnitude; whereas in actual division the numbers may differ by thousands.

As explained above, numbers other than 10, 100, and 1000, may also be expressed as logarithms; in which cases the logarithms, instead of being even numbers, would be numbers such as 2.113, etc. Here again the resultant logarithm is known as the logarithm of the answer.

Synopsis

Broadly speaking, my invention contemplates the combining of two numbers by use of their logarithms. Since the addition and the subtraction of logarithms is relatively easy to do electronically, and since the logarithms are of relatively similar magnitude, the answer will be more precise than if a large number was actually multiplied or divided by each other.

My circuit therefore converts each number to its logarithm, and adds or subtracts the logarithms to give the logarithm of the resultant; which may be used in that form, or may be converted to the actual answer.

Description of the invention

My invention may be readily understood from the block diagram of FIGURE 1. One input signal is applied to input terminals 10 and 12, and another input signal is applied to input terminals 14 and 16. Each of these input signals is processed by an amplifier such as 18 or 20 which preferably has a flat response curve, so that it will amplify all frequencies in an equal manner; a condition which may be necessary when the measurements are changing quickly from moment to moment. When the input signals are of the direct current type, switches 22 and 24 are closed. If the input signals are of the A.C. type, the switches are open, and the signals are passed through demodulators 26 and 28, whose outputs are of the direct current type.

These signals are then applied to logarithmic units 30 and 32; these units having the characteristic that their outputs are the logarithms of the input signals. Logarithmic units and circuits for achieving this type of output are well known; one such circuit being disclosed in Patent 2,995,706 issued to C. H. Clarridge on August 8, 1961. If desired, the logarithms may be amplified by amplifiers such as 34 and 36. The output of these amplifiers is applied to a combining network 37. As previously explained combining the logarithms is the equivalent of multiplying or dividing the numbers, and the output of combining network 37 is the logarithm of the answer.

If desired, the logarithm of the answer may be applied to a utilization device 40; which device may either use the logarithm itself, or convert the logarithm to the actual answer.

It may thus be seen that my invention operates upon two numbers to produce the logarithm of the answer, and that the numbers may be represented by either A.C. or D.C. signals. The logarithmic output may be applied to a device that actually draws a chart on so-called "logarithmic paper"; or alternatively the logarithmic output may be converted to a numerical value that may be displayed upon a suitable indicating device or meter.

There may be times when it is desired to compare an input signal with a given reference value, and to obtain the ratio of the input signal to this reference value. This result may be achieved as follows. Reference switches 42 and 44 are suitably activated, and insert a suitable reference signal into one or both of the input circuits, so that one or the other of the input signals may be compared with the reference signal.

Alternatively the circuitry may be calibrated by applying the same reference signal to both input channels. If desired, the reference signal may be given either a positive or a negative polarity, so that the input signal may be compared to either a positive or a negative reference signal.

*Embodiment of FIGURE 2*

FIGURE 2 shows an embodiment of my invention that comprises means for inserting a reference signal into the circuit.

In FIGURE 2, the input signals are applied to input terminals 50 and 52. The input signals pass through a switching network 53 that will be described later, and are applied to amplifiers such as 18 and 20, from whence the signals are applied to demodulators such as 26 and 28. These demodulators comprise transformers such as 54 and 56 that preferably have the characteristic that permits them to handle all frequency signals equally well, in order not to bias any particular frequency. The output of the transformers are passed through rectifying diodes such as 60, 62, 64, and 66, which convert the A.C. signal to a D.C. signal. The D.C. signals from the demodulators 26 and 28 are passed through logarithmic units 30 and 32, which convert the signal into the logarithmic signals as previously discussed. In order to subtract the logarithms the positive output from unit 30, and the negative output from unit 32 are applied to a subtraction network 39. Network 39 thus produces the subtraction previously discussed; and the result, which is the logarithim of the quotient, appears at output terminal 68, from whence it may be applied to any desired utilization device.

If the divisor is larger than the dividend, the logarithm at terminal 68 will be negative, thus corresponding to a quotient that is less than 1.

Switching network 53 operates as follows:

It will be seen that an input signal applied to input terminal 50 traverses switch 43, and is applied directly to amplifier 18. Similarly an input signal applied to input terminal 52 traverses switch 45, and is then applied to amplifier 20. With the switches 43 and 45 in the illustrated positions, the circuit operates as previously described.

In order to calibrate the equipment, the switches 43 and 45 are thrown to the left, to the "calibrate" position. In this switch position the input signal is not used at all. Instead a signal from "zero" point 70 of the reference source 46 is applied to both channels. Since both inputs are the same, when they are subtracted the output should be zero.

In calibrating the equipment, the action of the amplifiers and/or the demodulators and/or the logarithmic units may be adjusted to produce the desired zero output signal. When this is done, it assures that the circuit is balanced and operating properly.

When the switches 43 and 45 are thrown downward to the "plus position," switch 45 is still connected to zero point 70 of the reference source; but switch 43 is now connected to the positive point 72 of the reference source. This means that a predetermined "positive" reference signal is applied to the upper channel, while a "zero" signal is applied to the lower channel; thus calibrating the equipment for use with a "positive" input signal applied to the upper channel.

When the switches 43 and 45 are thrown to the right, to the "negative" position, switch 45 is still connected to the zero point 70, while switch 43 is now connected to the "negative" point 74 of the reference. This means that a predetermined "negative" reference signal is applied to the upper channel, while a "zero" signal is applied to the lower channel; thus calibrating the equipment for use with a negative input signal applied to the upper channel.

The disclosed operation permits the circuitry to be calibrated for zero, a plus value, and a minus value. These values may be used for checking the circuit, the utilization device, or for calibrating the instrument so that positive-going and negative-going signals may later be used.

Although the invention has been described and illustrated in detail, it is to be understood that the same is by way of illustration and example only and is not to be taken by way of limitation, the spirit and scope of this invention being limited only by the terms of the appended claims.

I claim:
1. The circuit comprising:
a pair of input channels, said channels comprising input means for accepting an input signal, demodulator means for demodulating said input signal when said input signal is of the A.C. type, means for converting said demodulated signal to its logarithmic value, switch means for causing said input signal to bypass said demodulator means when said input signal is of the D.C. type—whereby said input signal may be converted to its logarthmic value;
subtracting means for subtracting the logarithmic value of one channel from the logarithmic value of the other channel;
a source of reference signals comprising means for providing a positive reference signal, a zero reference signal, and a negative reference signal; and
means for substituting a signal from said reference source in place of one of said input signals.

2. A circuit comprising:
a pair of input channels, said channels comprising input means for accepting an input signal, demodulator means for demodulating said input signal when said signal is of the A.C. type, means for converting said demodulated signal to its logarithmic value, switch means for causing said input signal to bypass said demodulator means when said input signal is of the D.C. type—whereby said input signal may be converted to its logarithmic value;
subtracting means for subtracting the logarithmic value of one channel from the logarithmic value of the other channel;
a reference source comprising means for providing a positive reference signal, a zero reference signal, and a negative reference signal; and
means for substituting one of said reference signals from said reference source in place of one of said input signals.

3. A circuit comprising:
a pair of input channels, said channels comprising input means for accepting an input signal, demodulator means for demodulating said input signal when said signal is of the A.C. type, means for converting said demodulated signal to its logarithmic value, switch means for causing said input signal to bypass said demodulator means when said input signal is of the D.C. type—whereby said input signal may be converted to its logarithmic value;
subtracting means for subtracting the logarithmic value of one channel from the logarithmic value of the other channel;

a reference source comprising means for providing a positive reference signa' a zero reference signal, and a negative reference signal;

a switching network comprising a pair of switches;

means for substituting the output of one of said switches for one of said input signals; and means for substituting the output of the other said switch for the other of said input signals.

4. A circuit comprising:

a pair of input channels, said channels comprising input means for accepting an input signal, demodulator means for demodulating said input signal when said signal is of the A.C. type, means for converting said demodulated signal to its logarithmic value, switch means for causing said input signal to bypass said demodulator means when said signal is of the D.C. type—whereby said input signal may be converted to its logarithmic value;

subtracting means for subtracting the logarithmic value of one channel from the logarithmic value of the other channel;

a reference source comprising means for providing a positive reference signal, a zero reference signal, and a negative reference signal;

a switching network comprising a pair of switches, the output at one of said switches always being said zero reference potential, and the output of the other of said switches being selected said positive reference signal, said zero reference signal, and said negative signal;

means for substituting the output of one of said switches for one of said input signals; and means for substituting the output of the other of said switches for the other of said input signals.

5. A ratio meter comprising:

a pair of input channels, said channels comprising input means for accepting an input signal, first amplifying means for amplifying said signal, demodulator means for demodulating said amplified signal when said signal is of the A.C. type, means for converting said demodulated signal to its logarithmic value, second amplifier means for amplifying said logarithmic value, and switch means for causing said amplified signal to bypass said demodulator means when said input signal is of the D.C. type—whereby said input signal may be converted to its logarithmic value;

subtracting means for subtracting the amplified logarithmic value of one channel from the amplified logarithmic value of the other channel;

a utilization device operatively connected to the output of said subtracting means;

a reference source comprising means for providing a positive reference signal, a zero reference signal, and a negative reference signal; and means for substituting a signal from said reference source in place of one of said input signals.

6. A ratio meter comprising:

a pair of input channels, said channels comprising input means for accepting an input signal, first amplifying means for amplifying said signal, demodulator means for demodulating said amplified signal when said signal is of the A.C. type, means for converting said demodulated signal to its logarithmic value, second amplifier means for amplifying said logarithmic value, and switch means for causing said amplified signal to bypass said demodulator means when said input signal is of the D.C. type—whereby said input signal may be converted to its logarithmic value;

subtracting means for subtracting the amplified logarithmic value of one channel from the amplified logarithmic value of the other channel;

a utilization device operatively connected to the output of said subtracting means;

a reference source comprising means for providing a positive reference signal, a zero reference signal, and a negative reference signal;

a switching network comprising a pair of switches, the output at one of said switches always being said zero reference potential, and the output of the other of said switches being selected said positive reference signal, said zero reference signal, and said negative signal;

means for substituting the output of one of said switches for one of said input signals; and means for substituting the output of the other of said switches for the other of said input signals.

References Cited by the Examiner

UNITED STATES PATENTS

| | | | |
|---|---|---|---|
| 2,244,369 | 6/1941 | Martin. | |
| 2,880,393 | 3/1959 | Cornish | 324—99 X |
| 3,007,081 | 12/1959 | Sebastian | 307—88.5 X |

OTHER REFERENCES

Figure 6.18a and related discussion, Electronics Analog Computers, Korn and Korn, 2nd edition, 1956, pages 280 and 281.

JOHN W. HUCKERT, *Primary Examiner.*

ARTHUR GAUSS, *Examiner.*

E. DREYFUS, L. ZALMAN, *Assistant Examiners.*